Oct. 10, 1967   J. ERDOS   3,346,072
LUBRICATING DEVICE
Filed Dec. 18, 1964

INVENTOR,
JOHN ERDOS
BY Harry M. Saragovitz,
Edward J. Kelly, Herbert Berl
Charles F. Murphy
ATTORNEYS

United States Patent Office 3,346,072
Patented Oct. 10, 1967

3,346,072
LUBRICATING DEVICE
John Erdos, P.O. Box 4, Allenwood, Wall Township,
Monmouth County, N.J. 08720
Filed Dec. 18, 1964, Ser. No. 420,252
2 Claims. (Cl. 184—1)

ABSTRACT OF THE DISCLOSURE

A device for directing lubricant under pressure against one side of a bearing mounted on the shaft of a rotatable element while supporting and permitting observation of the opposite side of the bearing to determine the completion of lubrication.

---

The invention described herein, if patented, may be manufactured and used by or for the Government for governmental purposes without the payment to me of any royalty thereon.

This invention relates to a device for lubricating bearings mounted on the shaft of a rotatable element without removing the bearings from the shaft by engaging one side of said bearing in lubricant sealing relation and conducting lubricant under pressure against said one side of said bearing while supporting and permitting observation of the opposite side of the bearing to determine the completion of lubrication.

The proper lubrication of ball bearings commonly used on the shafts of high speed rotating elements is a continuing problem to users of this type of equipment. This is especially true where so-called sealed or shielded ball bearings are used as in blower motors used with frequency shift converters employed by the Armed Forces. If these bearings are not maintained adequately lubricated, the blower motor burns out and expensive equipment is damaged due to failure of the blower. It has been customary to oil these bearings semi-annually using a light oil applied with the assistance of a needle. However, since the openings in the shielded bearings are very narrow, only small amounts of oil penetrate into the bearings and the operation is very time-consuming. Furthermore, in order to obtain penetration into the bearings the viscosity of the oil must be so low that lubrication of the bearings becomes ineffective over an extended period of time and unless extreme care is exercised in applying oil to the bearings there is danger that they will burn out before the regularly scheduled re-oiling time occurs.

Lubricating devices have been employed, particularly in the automotive field, for packing shielded bearings such as wheel bearings by removing the bearings from their shafts, clamping them in the lubricating device so that one side of the shielded bearing is held tightly against the surface of a frustoconical cavity while lubricant under pressure is directed into the cavity through the central bore of the bearing and thence out through the balls or rollers of the bearing. However, in the electric motor art it is desirable to be able to lubricate the bearings of an armature without the necessity of removing them from the armature shaft. Removal of the bearings without damage and proper alignment on replacement require equipment and skills not generally available to personnel who must maintain these motors. This is particularly true for military uses such as in blower motors of frequency shift converters.

It is, therefore, an object of the invention to provide a device for lubricating a bearing mounted on the shaft of a rotatable element without removing the bearing from the shaft.

Another object is to provide a device for lubricating a shielded bearing mounted on the shaft of a rotatable element, such as the armature of a motor, without removing the bearing from the shaft.

Another object is to provide a device for lubricating a first shielded bearing mounted on the shaft of a motor armature near one end thereof and then a second shielded bearing mounted on the shaft of the motor armature near the other end thereof without removing the bearings from the shaft.

Various other objects and advantages will appear from the following description of one embodiment of the invention and in the appended claims.

Figure 1:
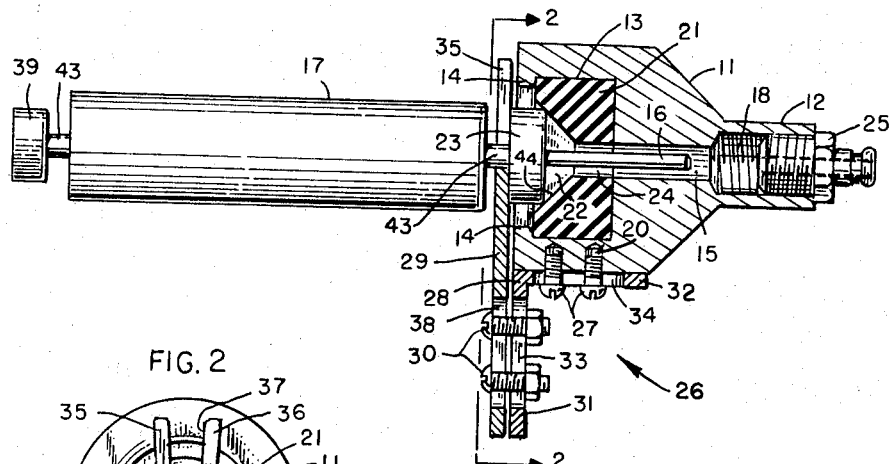
FIGURE 1 is a longitudinal cross-section of a lubricating device in accordance with the present invention with an electric motor armature having bearings mounted on its shaft positioned in and supported by the device for lubrication of one of the bearings in accordance with the invention.

In the illustrated embodiment of the invention the lubricating device comprises a generally cylindrical body member 11 having a generally cylindrical extension 12 of reduced diameter on one end thereof. A large central bore 13 is provided in the other end of body member 11, the outer end of said bore having an over-hanging lip 14 extending inwardly thereof for a purpose to be described. A smaller bore 15 sized to loosely receive the free end of shaft 16 of a rotatable element 17 therein is provided concentric with said large bore extending from the inner end thereof to the opposite end of body member 11 and the extension 12 thereon. The outer end of this smaller bore is tapped to provide an internal thread 18 for a purpose to be described. The exterior surface of body member 11 and extension 12 thereon may be knurled to facilitate gripping thereof while one side of body member 11 is provided with a longitudinally extending flat portion 19 having two longitudinally spaced tapped holes 20 therein for a purpose to be described.

A resilient gasket 21 is snugly mounted in the large central bore 13 of body member 11, being retained therein by over-hanging lip 14. The gasket, which is preferably made of a type of rubber resistant to attack by lubricants, is formed to define a generally open-ended frustoconical cavity 22 sized to receive the outer peripheral edge of a bearing 23 to be lubricated in the device. The gasket is provided with a central bore 24 extending from the inner end of said frustoconical cavity to said smaller bore 15 in body member 11, concentric therewith, and sized to loosely receive the free end of shaft 16 of a rotatable element 17 therein.

A conventional hydraulic lubrication fitting 25 is mounted in the tapped portion 18 of central bore 15 providing means for introducing lubricant under pressure from a lubricating gun or other lubricating source to the inner end of frustoconical cavity 22. It will be obvious that, if desired, the lubricating device may be directly mounted on the discharge end of a lubricating gun in lieu of the use of the hydraulic fitting shown.

A clamping device designated generally by reference numeral 26 is adjustably and releasably mounted on the flat portion 19 of body member 11 by two machine screws 27 engaging in tapped holes 20 in the flat portion 19 of said body member. The clamping device 26 is comprised of two members, a generally L-shaped bracket 28 and a substantially flat bifurcated member 29 joined together by two machine bolts 30.

Figure 3:
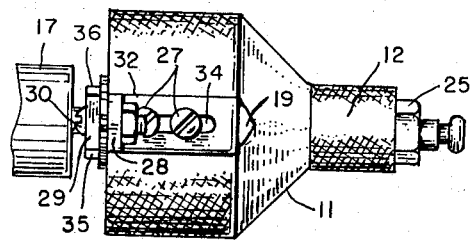
FIGURE 3 is a side elevation of the lubricating device of the present invention with an electric motor armature in place.

As shown in FIGURES 1 and 3, the L-shaped bracket 28 comprising legs 31 and 32 is provided with an elongated slot 33 and 34 respectively in each leg thereof to permit it to be adjustably positioned with respect to body member 11 and to permit adjustment between said L-shaped bracket 28 and said bifurcated member 29 respectively. Either or both slots may be open-ended to permit detachment of the clamping device 26 without complete removal of screws 27 or bolts 30.

Figure 2:
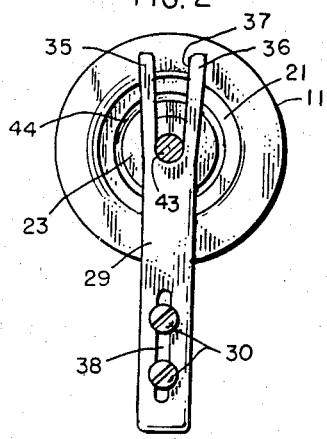
FIGURE 2 is a vertical cross-section taken along the line 2—2 of FIGURE 1.

Bifurcated member 29 includes diverging arms 35 and 36 defining an open-ended slot 37 in one end thereof as best seen in FIGURE 2 to permit the bifurcated member to straddle the shaft of a rotatable element and engage the under side of a bearing mounted thereon to support the bearing and maintain the peripheral edge of one side thereof in lubricant-sealing relation with gasket 21. The other end of bifurcated member 29 is provided with an elongated closed end slot 38 cooperating with said machine bolts 30 and the elongated slot 33 in leg 31 of L-shaped bracket 28 to provide a wide range of adjustability between the bifurcated member and the bracket.

Figure 4:
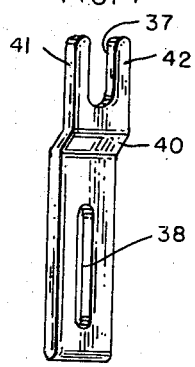
FIGURE 4 is a perspective view of a modified form of the bifurcated member of the clamping device of the present invention.

To provide for the lubrication of relatively small diameter sealed bearings mounted on the shafts of rotatable elements, such as shielded or sealed bearing 39 on the opposite end of shaft 16 of motor armature 17, a modified bifurcated clamping member 40 is provided as shown in FIGURE 4. Clamping member 40 is provided with offset arms 41 and 42, which are not as long as arms 35 and 36 of FIG. 2 and which may pass into central bore 13 and into frustoconical cavity 22 as far as necessary to cause a bearing of relatively small diameter to be clamped in lubricant-sealing relation with resilient gasket 21.

In the use of the lubricating device of the present invention, the clamping device 26 must be moved to a position which permits the bearing to be lubricated and the shaft upon which it is mounted to be introduced into position within the lubricating device. This movement of the clamping device may be accomplished by utilizing the wide range of adjustability provided therein or by removal of the clamping device from the body of the lubricating device by removal of screws 27. The bearing to be lubricated is then positioned against the resilient frustoconical surface of gasket 21 with any protruding portion of the shaft upon which the bearing is mounted extending into central bore 15. Bifurcated clamping member 29 is then positioned against the exposed side of the bearing with arms 35 and 36 thereof straddling the hub 43 or shaft of the rotatable element and engaging the exposed side of the bearing. Bolts 30 are then tightened if necessary to tightly join bifurcated member 29 and L-shaped bracket 28. Finally, with the bearing being held in sealing relation with frustoconical interior surface 44 of the resilient gasket 21 and the bifurcated clamping member 29 engaged against the exposed side of the bearing, screws 27 are tightened to fasten L-shaped bracket 28 to body member 11, thus clamping the bearing in lubricating position.

The desired lubricant is then introduced into the device through lubrication fitting 25 by means of a conventional lubricating gun or other source of lubricant under pressure. When sufficient lubricant has been forced through lubrication fitting 25, central bores 15 and 24, frustoconical cavity 22 and bearing 23 to properly pack the bearing, excess lubricant will be forced through the bearing and appear on the exposed side of the bearing. Thus, by observation of the exposed side of the bearing, for example the portion thereof lying between the arms 35 and 36 of the bifurcated clamping member 29, the completion of lubrication may be determined and the lubrication step terminated. The bearing may then be removed by releasing the clamping means such as by removal of screws 27.

If it is desired to lubricate a smaller bearing such as 39 shown on the other end of the armature in FIGURE 1 of the drawing, an offset bifurcated clamping member such as 40 shown in FIGURE 4 may be substituted for bifurcated member 29 since the smaller diameter of the bearing will necessitate a deeper penetration of the frustoconical cavity to achieve the desired peripheral seal. In other respects the operation of the device will be the same.

It is also possible, although somewhat less convenient, to employ the lubricating device of the invention without using clamping members 29 or 40 by holding the armature or the like by hand or by some other means so that the peripheral edge of the sealed bearing is maintained in lubricant-sealing relation to the resilient gasket while lubricant is being forced into the bearing.

Within reasonable limits of a selected lubricating device in accordance with this invention armatures of varying sizes having shielded or sealed bearings of varying diameters mounted on the shafts thereof may be quickly and conveniently lubricated by means of the device of this invention. Frustoconical cavity 22 is limiting with respect to the diameters of the shielded bearings which can be accommodated therein and form a lubricant-sealing relation between the bearing and the resilient gasket. However, the frustoconical interior surface 44 is particularly advantageous in that it permits the lubrication of shielded bearings having diameters from slightly greater than the diameter of central bore 24 of resilient gasket 21 to slightly less than the outside diameter of resilient gasket 21. Shielded bearings of any diameter between these limits will form a lubricant tight seal with gasket 21 around the periphery of the bearing such that lubricant will be forced through the bearing in the desired manner.

While the above-described embodiment of the invention relates to a device for lubricating the shielded bearings mounted on the shaft of a motor armature, it will be readily understood that the invention is applicable to various other types of bearings mounted on the shafts of rotatable elements of mechanical equipment. The size and shape of the component elements of the lubricating device may be varied without departing from the spirit of the invention.

The lubricating device of this invention provides a means for greatly increasing the speed and efficiency of lubricating shielded bearings mounted on the shafts of rotatable elements, such as armatures of motors. It renders unnecessary the removal of the shielded bearings from the shafts of such equipment in order to lubricate them. This in turn reduces the misalignment or misfitting of such bearings on the shafts since damage previously caused by removal of the bearings from the shafts for lubrication purposes is avoided. The overall costs of maintaining electric motors and other similar equipment having rotatable elements are accordingly reduced as a result of the present invention.

It will be understood that various changes in the details, materials, and arrangements of parts, which have been herein described and illustrated in order to explain the nature of the invention, may be made by those skilled in the art within the principle and scope of the invention as expressed in the appended claims.

I claim:

1. A device for lubricating a bearing mounted on the shaft of a rotatable element which has been removed from the equipment in which it is normally mounted without removing said bearing from said shaft comprising:

(a) a body member having an open end frusto-conical cavity therein defined by a generally frusto-conical interior surface capable of engaging the peripheral edge of one side of a bearing in lubricant sealing relation, said body member having an opening therein extending from the inner end of said frusto-conical cavity and concentric therewith for receiving the free end of the shaft upon which said bearing is mounted, means for supplying lubricant under pressure to the inner end of said cavity and first releasable fastening means mounted on the exterior thereof,
(b) a generally L-shaped bracket having an elongated slot in one leg thereof for cooperation with said first releasable fastening means for mounting said bracket on said body member for adjustment longitudinally with respect to the axis of said frusto-conical cavity in said body member,
(c) an elongated clamping member having a bifurcated portion on one end thereof, said bifurcated portion being capable of straddling the shaft on which said bearing is mounted and engaging the other side of said bearing while permitting observation of at least a portion of said other side of said bearing, the inner edges of said bifurcated portion diverging to define an open ended slot of gradually increasing width from the inner to the outer end thereof, and
(d) means for releasably and adjustably fastening the other end of said elongated clamping member to the other leg of said L-shaped bracket, said means comprising second releasable fastening means carried by one of the parts to be fastened and the other part having an elongated slot therein for cooperation with said second releasable fastening means for adjustment of said clamping member radially with respect to the axis of said frusto-conical cavity in said body member,
whereby said one side of a bearing to be lubricated may be releasably supported in lubricant sealing relation with said frusto-conical interior surface in said body member.

2. A device as in claim 1 wherein said first releasable fastening means comprises a plurality of threaded fasteners spaced longitudinally with respect to the axis of said frusto-conical cavity in said body member and said second releasable fastening means comprises a plurality of bolts spaced radially with respect to said axis.

References Cited
UNITED STATES PATENTS

| | | | |
|---|---|---|---|
| 1,505,776 | 8/1924 | Glade | 184—105 X |
| 2,396,124 | 3/1946 | Pitisci | 184—1 |
| 2,968,362 | 1/1961 | Elliott | 184—1 |
| 3,098,541 | 7/1963 | Kadas | 184—1 |
| 3,158,226 | 11/1964 | Williamson | 184—1 |

LAVERNE D. GEIGER, *Primary Examiner.*

E. J. EARLS, *Assistant Examiner.*